United States Patent
Findikli et al.

(10) Patent No.: US 6,594,482 B1
(45) Date of Patent: Jul. 15, 2003

(54) CONTROLLED TRANSMISSION OF WIRELESS COMMUNICATIONS DEVICE IDENTITY

(75) Inventors: Nadi S. Findikli, Cary, NC (US); Inderpreet S. Ahluwalia, Chapel Hill, NC (US); Hans Carlson, Cary, NC (US); Annika B. Lindh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/391,269

(22) Filed: Sep. 7, 1999

(51) Int. Cl.$^7$ .......................... H04M 1/66; H04M 1/68; H04M 3/16; H04M 1/00; H04B 1/38
(52) U.S. Cl. ..................... 455/411; 455/551; 455/558
(58) Field of Search .......................... 455/550–552, 455/558–560, 411, 410, 404

(56) References Cited

U.S. PATENT DOCUMENTS

| | | | |
|---|---|---|---|
| 6,119,000 A | * | 9/2000 | Stephenson et al. ........ 455/432 |
| 6,373,949 B1 | * | 4/2002 | Aura ........................... 380/247 |
| 6,387,027 B1 | * | 5/2002 | Bodin ......................... 455/419 |

FOREIGN PATENT DOCUMENTS

| | | |
|---|---|---|
| EP | 0 685 972 A2 | 12/1995 |
| WO | WO 97/07642 | 2/1997 |
| WO | WO 98/12891 | 3/1998 |
| WO | WO 98/30050 | 7/1998 |
| WO | WO 99/33309 | 7/1999 |
| WO | WO 99/40744 | 8/1999 |

OTHER PUBLICATIONS

Mehrotra, Ahsa and Golding, Leonard S.; Mobility and Security Management in the GSM System and Some Proposed Future Improvements; Proceedings of the IEEE, vol. 86, No. 7, Jul. 1998, pp. 1480–1497.

TR–45 Proposed ballot of TR–45 UNIM/ESN Ad Hoc Group Recommendation; Chaired by Terry Watts, SBC Technology Resources, 9505 Arboretum Blvd., Austin, TX78759; dated Jul. 29, 1999.

The study of ESN issue in authentication procedure; Michio Kudo, DDI Corporation and Masayoshi Ohashi, KDD R&D Laboratories, Inc.; dated Jun. 7, 1999, Vancouver.

* cited by examiner

Primary Examiner—Nguyen T. Vo
Assistant Examiner—Edan Orgad
(74) Attorney, Agent, or Firm—Coats & Bennett, P.L.L.C.

(57) ABSTRACT

Selected identifiers belonging to the wireless communications device are provided to a network entity based upon the control function being processed, or more generally, upon the class of control function being processed. In one embodiment, a Mobile Switching Center (MSC) receives a plurality of identifiers and a control function request from a wireless communications device. The MSC determines which of the identifiers are needed by the network entity to process the requested control function based on the control function requested. The MSC filters the received identifiers to remove un-needed identifiers based on its analysis and forwards the filtered identifiers to the network entity and/or to another network. In another embodiment, the present invention pushes the determination of which identifier to send downward to the wireless communications device itself. In these embodiments, the wireless communications device is programmed to determine which identifier is needed, and this identifier is transmitted to the MSC with the control function message. This determination by the wireless communications device of which identifier is needed is independent of the network, not simply a response to a command from the network. The present method helps insure that the proper identity is sent by the MSC to other network entities when the wireless communications device includes more than one fixed identifier. The method is particularly adapted for situations where the wireless communications device includes a subscription module having a subscription module identifier and mobile terminal having a mobile terminal identifier.

18 Claims, 4 Drawing Sheets

CONTROLLED TRANSMISSION OF WIRELESS COMMUNICATIONS DEVICE IDENTITY

BACKGROUND OF THE INVENTION

The present invention relates to the field of cellular wireless communications, and more particularly, to a method of controlling the transmission of identities associated with a wireless communications device to a wireless communications network.

In order for a wireless communications network to check whether a particular service subscription is valid, or to cross-reference other relevant data, the network must be able to identify the subscription. Typically this is done by having the wireless communications device provide a unique identifier to the network when requesting service. For instance, in a traditional ANSI-41/ANSI-136 network, a cellular phone transmits its Electronic Serial Number (ESN) when the phone performs any one of a variety of wireless communications control functions, such as registration or call origination. The control of this identity transmission in ANSI-41/ANSI-136 is based upon a broadcast control bit, known as the "S" bit, that the network may selectively turn on or turn off. When the S-bit is turned on, the wireless communications devices directly interacting with the network are required to transmit the identity when performing any of the wireless communications control functions known generally as registration, origination, page response, base station challenge order, R-data (teleservices), and SPACH confirmation.

Further, it is possible that wireless communications devices will have more than one identity. Traditionally, a wireless communications device had one unique fixed identity in ANSI-41/ANSI-136 networks. In the ANSI-136 nomenclature, this was the ESN. The wireless communications device was manufactured with this ESN, which under FCC regulations cannot be altered after manufacture. The traditional ANSI-41/ANSI-136 service subscription was then tied to a particular wireless communications device, typically by including the ESN as part of the subscription information uplinked to identify the subscription to the network. Thus, the traditional ANSI-41/ANSI-136 subscriber could not use a different piece of equipment, such as another user's phone handset, for the same subscription.

The situation with traditional ANSI-41/ANSI-136 is to be contrasted with that under the standard known as Global System for Mobile Communication (GSM). In the GSM world, a wireless communications device has two functional parts, a subscription module and a mobile terminal. The subscription module, commonly known as either the Subscriber Identity Module (SIM), the SIM card, or a User Identity Module (UIM), may be thought of as an electronic identification card; it contains the subscription-related information required to verify the subscriber to the network. The SIM card typically includes memory and other electronics for performing a variety of functions, but the SIM card does not include the transceiver electronics necessary for the main GSM wireless communications. For reference, see GSM 11.11 and GSM 11.14 for SIM card specifications in the GSM network. Relevant to the present discussion, the SIM card contains a fixed subscription identifier, similar to that of the ESN of ANSI-136. For ease of reference, this identifier will be referred to as the $ESN_s$.

The GSM mobile terminal is the rest of the wireless communications device without the subscription module. Thus, the mobile terminal is the handset or other main unit that includes the main GSM transceiver circuits, the speaker, etc. The mobile terminal likewise includes a fixed identifier, which is referred to as the International Mobile Equipment Identifier (IMEI), or the $ESN_m$.

The GSM subscription module is inserted or otherwise connected to the GSM mobile terminal to form a complete wireless communications device that is useable in GSM. The subscription information is read from the subscription module by the mobile terminal and transmitted to the network where the network determines whether the subscription is valid and registers the location of the subscription within the network. Thus, the GSM service subscription is typically not tied to a specific mobile terminal, but rather is tied to the subscription module. Because the subscription module authenticates the user to the network, the user is free to use any compliant mobile terminal equipment by simply mating their subscription module to the mobile terminal and repeating the authentication and registration process with the new mobile terminal hardware. Thus, it is not always necessary for the user to carry the complete wireless communications device in order to access his/her wireless service subscription. Instead, the user need only carry the subscription module and mate the module to an appropriate mobile terminal available on-location.

It should be noted that there is a provision in GSM for the network to request that the wireless communications device send the $ESN_m$ of the mobile terminal, typically for purposes of tracking lost or malfunctioning mobile terminals. The process for this in GSM is for the GSM network to make point-to-point contact with a particular wireless communications device and request that particular wireless communications device to send its $ESN_m$.

The idea of allowing the use of small, inexpensive subscription modules, similar to SIM cards, is gaining favor in the ANSI-41/ANSI-136 world due to the desire for subscription mobility. However, traditional ANSI-41/ANSI-136 contemplates the existence of only one fixed identity per wireless communications device, not two or more. Quite simply, ANSI-41/ANSI-136 anticipates that the equivalent to the subscription module will always be mated to the same mobile terminal, and will not be portable between mobile terminals, therefore only one fixed identity is required per wireless communications device. Because newer subscription-module-enabled wireless communications devices will have two (or more) fixed identities, ANSI-41/ANSI-136 networks may need to be modified to accommodate the presence of more than one fixed identifier associated with a wireless communications device. For instance, a particular network entity, such as the Authentication Center, may need the identity of the subscription module for some control functions and the identity of the mobile terminal for others. Thus, there is a need for an improved ANSI-41/ANSI-136 protocol that accommodates the presence of more than one fixed identifier associated with a wireless communications device. Such a method should preferably allow the network entity to be provided with one type of wireless communications device identity during some control functions, and another type of identity during other control functions.

From the above, it is clear that there remains a need for an improved method of controlling the provision of wireless communications device identities to various entities within the wireless communications networks.

SUMMARY OF THE INVENTION

The present invention determines which of two or more identifiers belonging to the wireless communications device should be provided to the network entity based upon the control function being processed, or more generally, upon the class of control function being processed. In one embodiment, a Mobile Switching Center (MSC) receives a plurality of identifiers and a control function request from a wireless communications device. The MSC determines which of the identifiers are needed by the network entity to process the requested control function based on the control function requested. The MSC filters the received identifiers to remove unneeded identifiers based on its analysis and forwards the filtered identifiers to the network entity and/or to another network.

In another embodiment, the present invention pushes the determination of which identifier to send downward to the wireless communications device itself. In these embodiments, the wireless communications device is programmed to determine which identifier is needed, and this identifier is transmitted to the MSC with the control function message. This determination by the wireless communications device of which identifier is needed is independent of the network, not simply a response to a command from the network. While the network may signal to the wireless communications device whether or not to send an identifier, it is the wireless communications device that determines which of a plurality of identifiers to send.

The present method may be used to help insure that the proper identity is sent by the MSC to other network entities when the wireless communications device includes more than one fixed identifier. The method is particularly adapted for situations where the wireless communications device includes a subscription module having a subscription module identifier and mobile terminal having a mobile terminal identifier.

DETAILED DESCRIPTION

Figure 1:
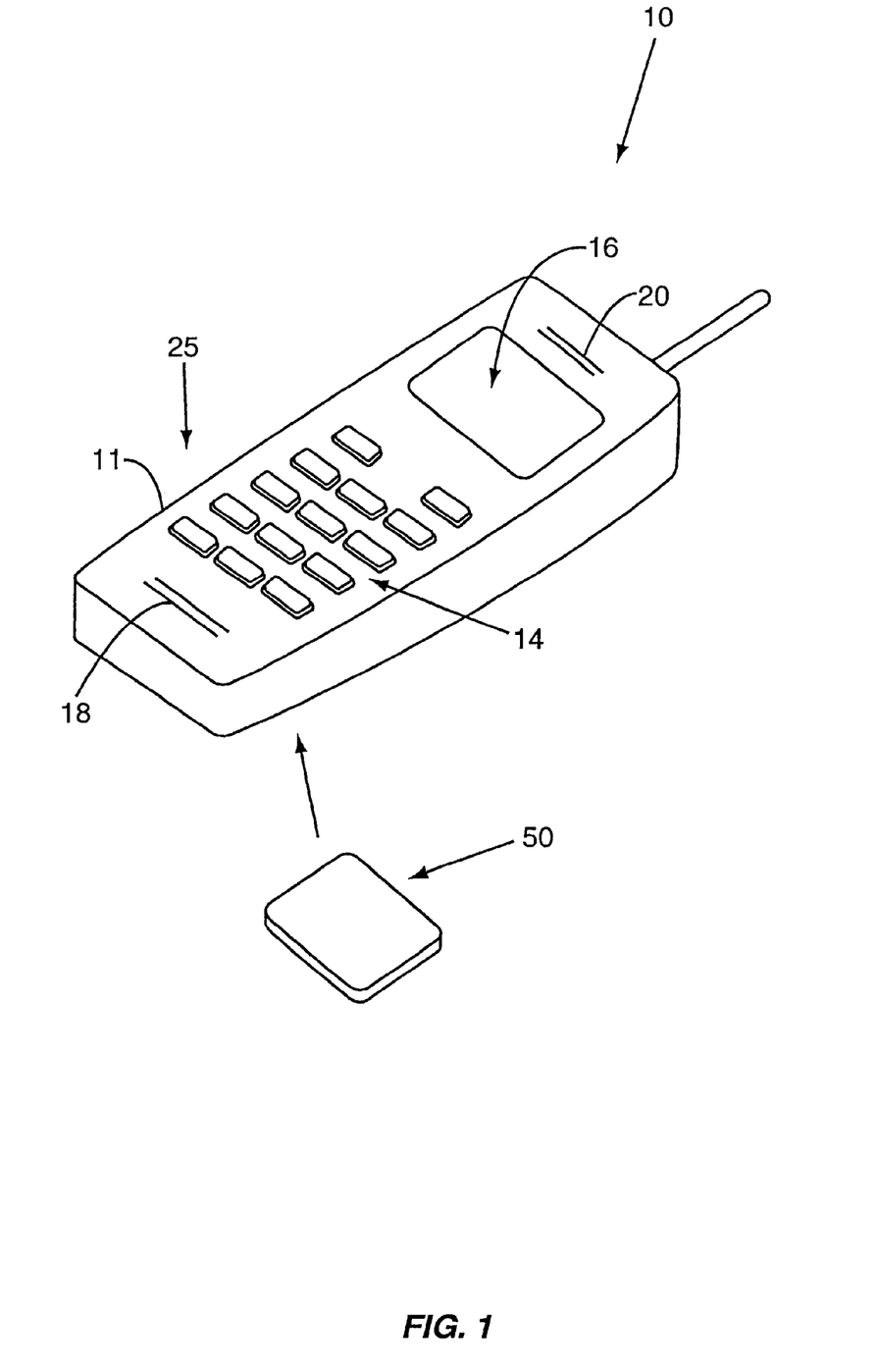
FIG. 1 is a perspective view of a wireless communications device showing a mobile terminal and a subscription module.
Figure 2:
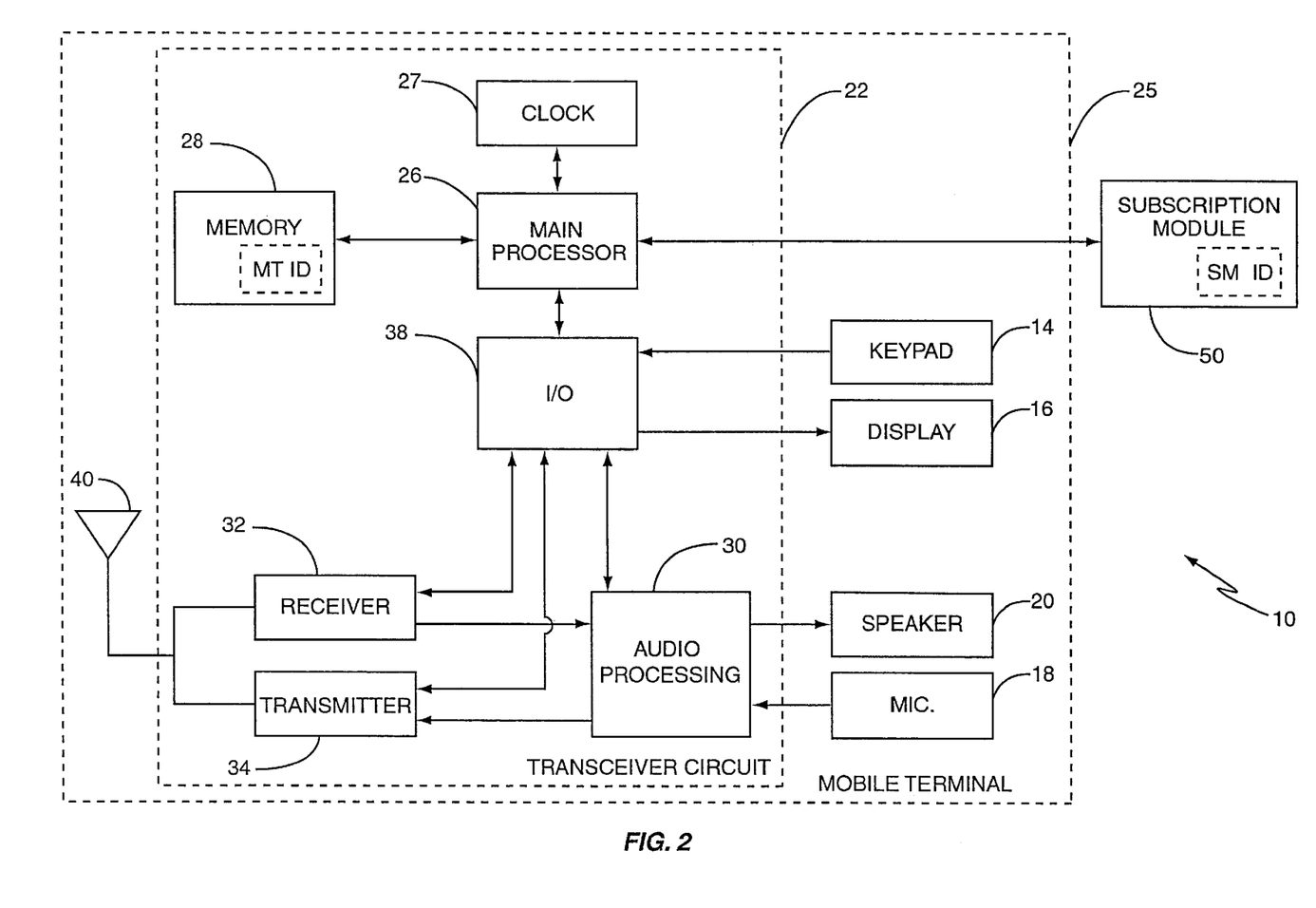
FIG. 2 is a schematic illustration of the components of FIG. 1.

A wireless communications device 10 having a fully functional mobile transceiver capable of transmitting and receiving radio frequency signals, such as a phone, is shown in FIGS. 1–2. For simplicity of discussion, a cellular telephone will be used as the example of the wireless communications device 10. The phone 10 typically includes a main unit 25, sometimes referred to herein as the mobile terminal, and a subscription module 50. See FIG. 1. The mobile terminal 25 includes a housing that contains a keypad 14, a display 16, a microphone 18, and a speaker 20. The keypad 14, display 16, microphone 18, and speaker 20 interface with a conventional transceiver circuit 22 generally disposed inside the housing 11 of the mobile terminal 25. The transceiver circuit 22, shown in FIG. 2, includes a main controller 26, such as a microprocessor, for controlling the overall operation of the mobile telephone 10, memory 28, audio processing circuits 30, a receiver 32, a transmitter 34, and optionally a clock 27. Input/output circuits 38 interface the control unit 26 with the keypad 14, display 16, audio processing circuits 30, receiver 32, and transmitter 34. The keypad 14 allows the operator to dial numbers, enter commands, and select options. The display 16 allows the operator to see dialed digits, stored information, and call status information. The audio processing circuits 30 accept analog audio inputs from the microphone 18 and provide basic analog audio outputs to the speaker 20. Memory 28 stores programs and data used by phone 10. The optional clock 27 helps determine the current time. The receiver 32 and transmitter 34 connect to a common antenna 40 to receive and transmit signals over an RF channel.

The mobile terminal 25 further includes a fixed mobile terminal identifier; the mobile terminal identifier is preferably hardcoded into a portion of the transceiver circuit 22, such as memory 28, and should not be alterable by the user under normal circumstances. For purposes of this illustrative example, the mobile terminal identifier is formatted to meet the requirement of an Electronic Serial Number (ESN) of ANSI-41/ANSI-136, but this is not required for all embodiments. Because the details of the general construction and operation of the mobile terminal 25, including transceiver circuit 22, are well-known in the art, they will not be further discussed herein except as appropriate to place the invention in context, or to highlight significant differences Removably attached to the mobile terminal 25 is a subscription module 50 that includes subscription information. While the subscription module 50 may include memory and other electronics for performing a variety of functions, for purposes of this invention the subscription module 50 contains an identifier, referred to herein as the subscription module identifier. Like the mobile terminal identifier, the subscription module identifier is preferably hardcoded into the subscription module 50.

Figure 3:
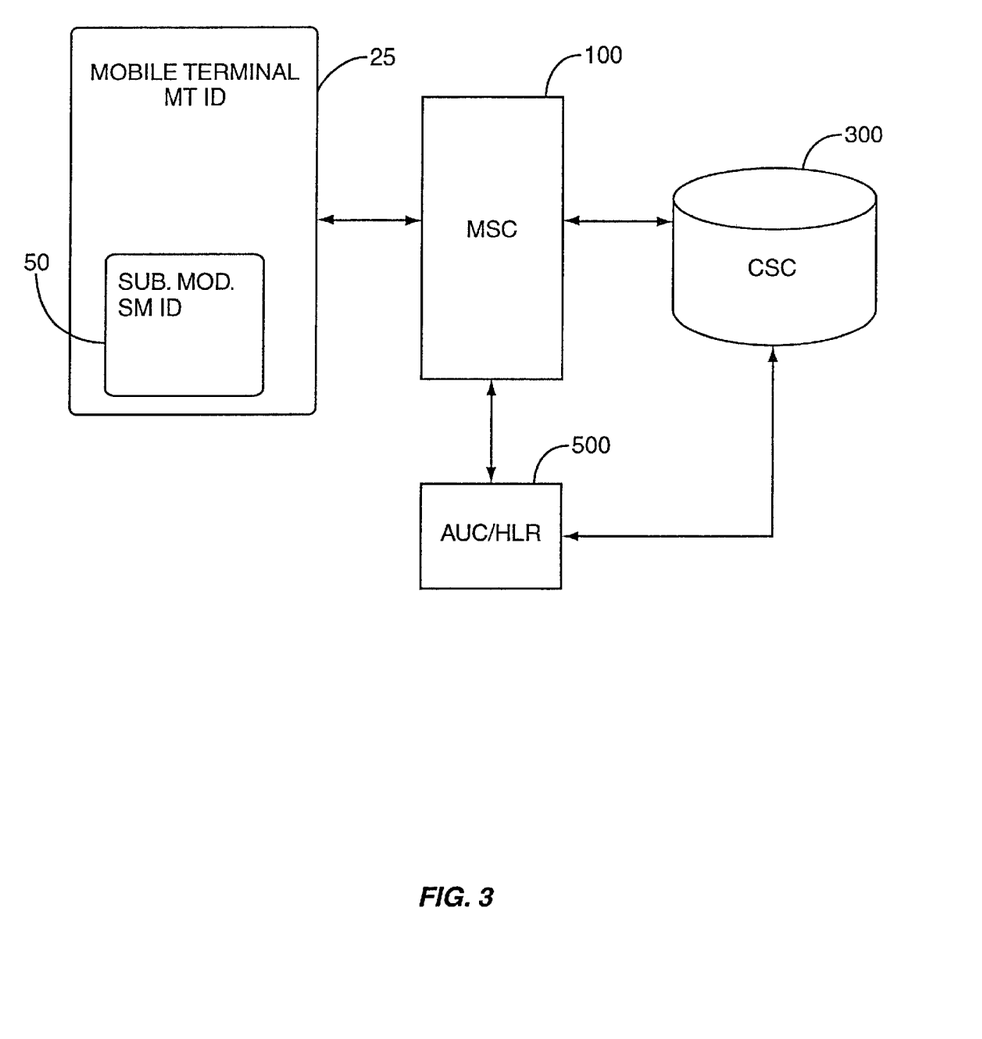
FIG. 3 is a schematic illustration of the wireless communications device and the main components of the wireless communications network.

Multiple wireless communications devices 10 communicate with each other, and with landline phones of the Public Switched Telephone Network, via a wireless communications network. The typical main components of a wireless communications network are illustrated in FIG. 3. A Mobile Switching Center 100 (MSC) provides for transferring information between the various wireless communications devices 10 and the other components of the network. A Customer Service Center 300 (CSC) stores information regarding the subscription including subscription data and identifiers that provide for the system to recognize each subscription. The AUC/HLR 500 includes information related to subscriptions that allow the network to authenticate subscriptions, locate registered subscriptions, and similar functions. The general functioning of these network entities 100,300,500, except as explained further below, is well known in the art and need not be further described herein for understanding the present invention by those of ordinary skill in the art, or to highlight significant differences.

In communicating with the network, the phone 10 performs a variety of control functions. These control functions are related to the control of information flow between the phone 10 and the network and involve the transmission of control messages from the wireless communications device to the network. The messages associated with the control functions are typically transmitted on control channels, but it is known in the art to also usurp all or part of traffic channels for control functions in some instances. Examples of the control functions include registration, call origination, page response, R-data, base station challenge order, SPACH confirmation, and the like. These control functions are to be differentiated from regular traffic functions such as encoding, decoding, and the like.

In general, the control functions may be grouped into several classes, depending on their general purpose. For instance, the following control function classes may exist: registration, call origination, paging, and other. Each control function class contains one or more control functions. For instance, the registration class includes power-up registration, periodic re-registration, power-down registration, and similar control functions.

Frequently, for the network to properly handle and authenticate the control function message generated by the phone 10, the network must know the identity of the phone 10. While it is sometimes necessary for the MSC 100 to know this identity, frequently it is other parts of the network, such as the AUC/HLR 500 that need the phone's identity. In the prior art ANSI-41/ANSI-136 arrangement, the phone 10 had only one fixed identifier that was transmitted, the ESN, so it was clear which identity was needed since there was only one. However, with the advent of phones 10 having multiple fixed identities, and in particular one fixed identifier associated with the mobile terminal and a different fixed identifier associated with the subscription module, the particular identity of interest to the non-MSC 100 part of the network may vary depending on circumstances. For instance, for activation, the network may be interested in the subscription module identifier, but for page response, the network may be interested in the mobile terminal identifier. Thus, there is a need for the MSC 100 to provide the network with different fixed identifiers associated with the phone 10, depending on circumstances. The present method provides a manner of doing so.

In one embodiment, the MSC 100 is provided with both identifiers, but the MSC 100 selects which of the identifiers to forward to the other portion(s) of the network based on which control function is being used. For purposes of this example, assume that the MSC 100 is supplying data to the AUC/HLR 500. The phone 10 transmits both the subscription module identifier and the mobile terminal identifier to the MSC 100 as part of a control function message. The MSC 100 receives the control function message and the associated identifiers. The MSC 100 examines the control function message to see what control function is called for. Based on the control function called for, the MSC 100 selects either the subscription module identifier or the mobile terminal identifier. The MSC 100 then assembles and transmits its message to the AUC/HLR 500, with the message including the selected identifier. In effect, the MSC 100 is provided with both the subscription module identifier and the mobile terminal identifier and the MSC 100 filters out one or the other based on the control function being processed.

Figure 4:
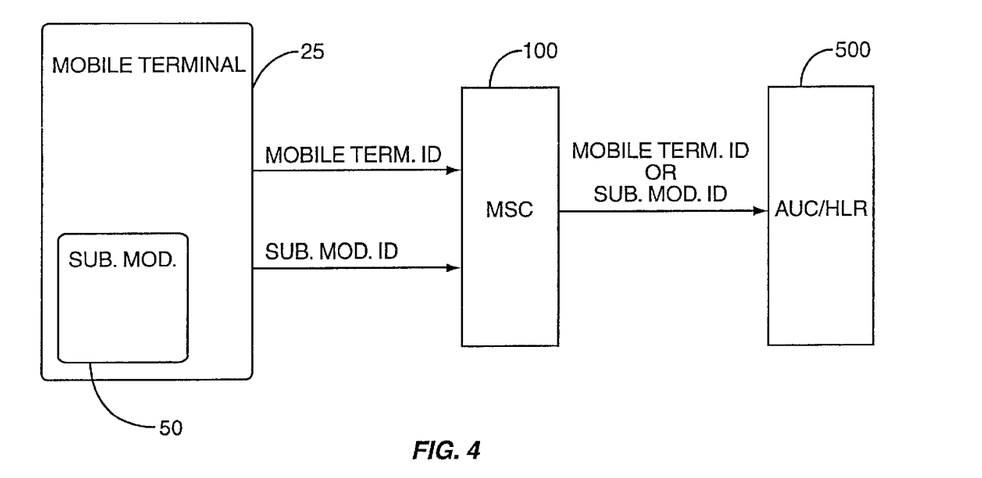
FIG. 4 is a schematic illustration of the wireless communications device sending two separate identifiers to the mobile switching center.

The flow of the identifiers is shown in FIG. 4 wherein both the subscription module identifier and the mobile terminal identifier are directed to the MSC 100 and only one or the other is forwarded from the MSC 100 to the AUC/HLR 500. By way of example, assume that a network generally tracks and communicates with wireless communication devices based on their mobile terminal identifier. Further assume that the subject control function is over-the-air activation of a previously un-activated subscription module. In such a situation, the phone 10 will transmit a control function message containing both its subscription module identifier and mobile terminal identifier to the MSC 100, along with appropriate information necessary for access to the network, such as an AMIN generated from information in the subscription module identifier. The MSC 100 will receive the control function message and analyze the control function message to identify the type of control function called for. In this instance, the MSC 100 will determine that the message is an activation request based on the presence of the AMIN, or by any other means known in the art. For activation requests, the MSC 100 is pre-programmed to know that the AUC/HLR 500 needs the subscription module identifier. As such, the MSC 100 will assemble the appropriate message containing the subscription module identifier information and forward it to the AUC/HLR 500. The AUC/HLR 500 will then process the authentication request and return the appropriate information to the wireless communications device via the MSC 100. Because the present invention is concerned with the "upward" flow of identification information (from phone 10 to network), the details of the "downward" flow of information (from network to phone 10) are unimportant for purposes of understanding and using the present invention.

As a further example, assume that the subject control function is a page response where the AUC/HLR 500 needs the mobile terminal identifier but not the subscription module identifier. The process flow is very similar in such a situation. As above, the phone 10 will transmit a control function message containing both its subscription module identifier and mobile terminal identifier to the MSC 100, along with other appropriate information necessary for access to the network. The MSC 100 will receive the control function message and analyze the control function message to identify the type of control function called for. In this instance, the MSC 100 will determine that the message is a page response based on header information in the message, or by any other means known in the art. For page responses, the MSC 100 is pre-programmed to know that the AUC/HLR 500 needs the mobile terminal identifier. As such, the MSC 100 will assemble the appropriate message containing the mobile terminal identifier information and forward it to the AUC/HLR 500. The AUC/HLR 500 will then process the page response.

The embodiments described above have the MSC 100 determining which of the identifiers to forward to the AUC/HLR 500. In such an arrangement, the phone 10 sends both identifiers to the MSC 100 even though only one or the other may actually be required by the AUC/HLR 500. As such, some portion of transmission bandwidth may be unnecessarily consumed in some instances. Other embodiments of the present invention address this problem by pushing the determination of which identifier to send downward to the wireless communications device itself. In these embodiments, the phone 10 is programmed to determine which identifier is needed, and only this identifier is transmitted to the MSC 100 with the control function message. Typically, the main controller 26 of the phone 10 processes the determination of which identifier to send, although other components within the phone 10 may also serve this function. In response to a user input, or in response to an internal timer, or for any other reason known in the art, the phone 10 initiates a control function. Before sending the control function message to the MSC 100, the phone 10 selects either the subscription module identifier or the mobile terminal identifier and includes the selected identifier in the control function message. Which identifier is selected will depend on the nature of the control function, in a fashion similar to that described above for the MSC 100. It should be noted that the selection of the identifier by the phone 10 is based on logic preprogrammed into the phone 10, and not on any setting established by the network. That is, the phone 10 is independently determining which identifier to send, not simply responding to a command from the network. While the network may signal to the phone 10 whether or not to send an identifier, it is the phone 10 that determines which of a plurality of identifiers to send.

Figure 5:
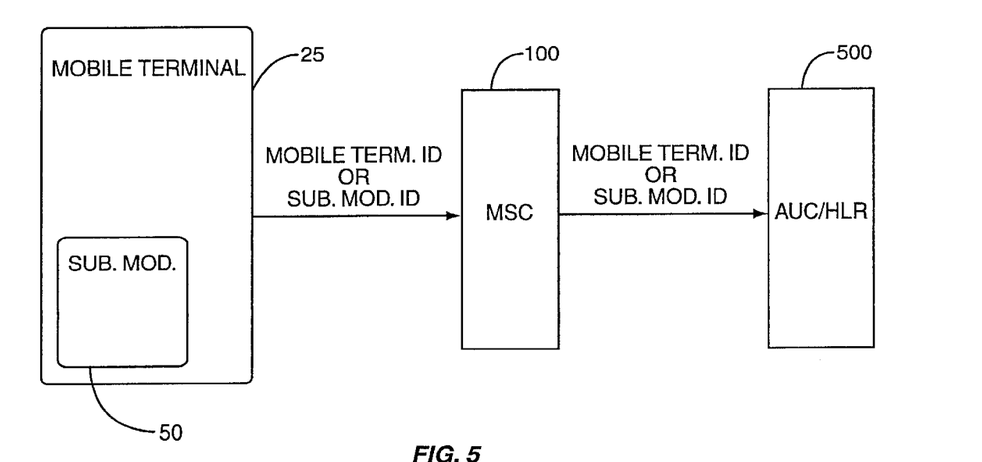
FIG. 5 is a schematic illustration of the wireless communications device sending a single identifier to the mobile switching center.

When the control function message is assembled, the phone 10 transmits the message, including the selected identifier, to the MSC 100. The MSC 100 receives the control function message and processes it in a traditional fashion. This flow of identifiers is shown in FIG. 5 wherein either the subscription module identifier or the mobile terminal identifier are directed to the MSC 100 and that identifier is forwarded from the MSC 100 to the AUC/HLR 500.

When this embodiment encounters an over-the-air activation of a previously un-activated subscription module as described above, the phone 10 initiates an activation request control function. The phone 10 is pre-programmed to know that for an activation request, the network will need the subscription module identifier. As such, the phone 10 generates and transmits a control function message that includes the subscription module identifier. The MSC 100 receives this message and responds by forwarding the appropriate information to the AUC/HLR 500, including the subscription module identifier. Thus, the determination of which identifier to send is made by the phone 10, and the MSC 100 merely passes on the sent identifier. Likewise, when this embodiment encounters a page response as previously described, the phone 10 generates a page response control function message including the mobile terminal identifier and transmits the same to the MSC 100. The MSC 100 receives this message and responds by forwarding the appropriate information to the AUC/HLR 500, including the mobile terminal identifier. As can be seen from these examples, it is the wireless communications device 10 that determines which identifier to send based on the subject control function.

The present method may be used to help insure that the proper identity is sent by the MSC 100 to other network entities when the phone 10 includes more than one fixed identifier. The method is particularly adapted for situations where the phone 10 includes a subscription module having a subscription module identifier and mobile terminal having a mobile terminal identifier.

For clarity, the discussion above has assumed that the determination of which identifier to send was based on the particular control function being processed. However, rather than looking at each control function as a separate case, the control functions may be grouped into classes where the control functions in a given class share the same identifier requirements. Thus, the determination may be indirectly based on the particular control function being processed by examining the class of control function, rather than the exact control function itself.

The present invention may also include the phone 10 having any number of separate fixed identifiers that are filtered before being sent to the network. Additionally, more than one identifier may be sent from the phone 10 to the MSC 100 and the MSC 100 to the network. By way of example, the phone 10 may include five identifiers. For the first described embodiment, the phone 10 transmits the five identifiers to the MSC 100 which filters the identifiers and forwards less than the five identifiers depending on which are needed by the network. For the second described embodiment, the phone 10 may transmit four or less of the identifiers to the MSC 100. The present invention may also include sending the identifiers to components within the network other than the AUC/HLR 500 and CSC 300. Additionally, the identifiers may be transmitted to other networks.

For clarity, the discussion above has assumed that the wireless communications device 10 is a cellular telephone. However, it is to be understood that other wireless communications devices, such as personal communications assistants, pagers, and the like, are also within the scope of the present invention. Further, the discussion focused on the operation of the present invention in the context of an ANSI-41/ANSI-136 network. However, the present invention is not so limited, but may instead apply to terrestrial GSM, IS-95, CDMA, WCDMA, cdma 2000, and similar networks, and also to satellite based networks.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of providing a wireless communications network entity with identifiers sent from a wireless communications device, said wireless communications network entity forming a portion of a first wireless communications network having a mobile switching center therein, the method comprising:
   a) receiving a plurality of identifiers and a control function request at a mobile switching center from a wireless communications device;
   b) determining, at the mobile switching center, which of said plurality of identifiers are needed by the network entity to process said requested control function based on the control function requested, and filtering said plurality of received identifiers to remove un-needed identifiers based on said determining;
   c) in response to said received control function request, forwarding said filtered identifiers from said mobile switching center to said network entity.

2. The method of claim 1 further including, prior to said receiving, programming said mobile switching center to perform said determining based on type of control function request.

3. The method of claim 1 wherein said network entity includes an authentication center.

4. The method of claim 1 further including forwarding the filtered identifiers to a second wireless communications network.

5. A method of determining the identifiers transmitted to a wireless communications network from a wireless communications device comprising:
   a) receiving a control function request, a mobile terminal identifier and a subscription module identifier from the wireless communications device at a mobile switching center;
   b) selecting, at said mobile switching center, either the mobile terminal identifier or the subscription module identifier, said selection based on the control function requested; and
   c) transmitting the selected identifier from said mobile switching center to another portion of the wireless communications network.

6. The method of claim 5 wherein said another portion of the wireless communications network includes an authentication center.

7. A method of controlling the transmission of identifications associated with a wireless communications device to a wireless communications network, the wireless communications device having a plurality of fixed identifiers and selectively performing a plurality of control functions, the method comprising the steps of:

a) initiating one of the plurality of control functions for processing;

b) the wireless communications device independently dividing the plurality of identifiers into selected and unselected groups based on the control function initiated; and c) while processing the initiated control function, the wireless communications device transmitting identifiers belonging to the selected group to the wireless communications network.

8. The method of claim 7, wherein transmitting the selected identifier to the wireless communications network includes transmitting the selected identifier as a portion of a control function message from the wireless communications device to the network.

9. The method of claim 7, wherein the wireless communications device includes a subscription module having a fixed subscription module identifier and a mobile terminal having a fixed mobile terminal identifier, and the plurality of identifiers include the subscription module identifier and the mobile terminal identifier.

10. The method of claim 9 wherein the selected identifier is the subscription module identifier.

11. The method of claim 9 wherein the selected identifier is the mobile terminal identifier.

12. The method of claim 7 wherein said step of the wireless communications device transmitting identifiers belonging to the selected group to the wireless communications network while processing the initiated control function comprises said wireless communications device selecting at least one of the identifiers based on a program stored within the wireless communications device, said selection being dependent on the control function requested, and transmitting the selected identifiers to the wireless communications network.

13. The method of claim 12 wherein the plurality of identifiers includes a subscription identifier corresponding to a subscription and a mobile terminal identifier corresponding to a mobile terminal, and wherein said mobile terminal performs said selecting and said transmitting.

14. The method of claim 12 wherein said initiating a request includes a user pushing a key on said wireless communications device.

15. The method of claim 12 wherein said wireless communications device is an ANSI-136 complaint cellular mobile telephone.

16. The method of claim 12 wherein said control function request belongs to the one of the following control function classes: registration, page response, and call origination.

17. The method of claim 12 wherein the wireless communications device includes a subscription module having a fixed subscription module identifier and a mobile terminal having a fixed mobile terminal identifier and wherein the selected identifiers consist of said subscription module identifier.

18. The method of claim 12 wherein the wireless communications device includes a subscription module having a fixed subscription module identifier and a mobile terminal having a fixed mobile terminal identifier and wherein the selected identifiers consist of said mobile terminal identifier.

* * * * *

UNITED STATES PATENT AND TRADEMARK OFFICE
CERTIFICATE OF CORRECTION

PATENT NO. : 6,594,482 B1
DATED : July 15, 2003
INVENTOR(S) : Nadi S. Findikli et al.

It is certified that error appears in the above-identified patent and that said Letters Patent is hereby corrected as shown below:

<u>Title page,</u>
Item [75], Inventors, "Carlson" should be -- Carlsson --.

Signed and Sealed this

Twenty-first Day of October, 2003

JAMES E. ROGAN
*Director of the United States Patent and Trademark Office*